United States Patent [19]

Yamamoto et al.

[11] Patent Number: 4,933,417
[45] Date of Patent: Jun. 12, 1990

[54] PIGMENT DISPERSING AGENT

[75] Inventors: Toshio Yamamoto; Yoshiro Matsubara, both of Yokohama, Japan

[73] Assignee: Nippon Oil and Fats Co., Ltd., Japan

[21] Appl. No.: 283,477

[22] PCT Filed: Jun. 25, 1988

[86] PCT No.: PCT/JP88/00638

§ 371 Date: Dec. 2, 1988

§ 102(e) Date: Dec. 2, 1988

[87] PCT Pub. No.: WO88/10148

PCT Pub. Date: Dec. 29, 1988

[30] Foreign Application Priority Data

Jun. 26, 1987 [JP] Japan .................. 62-159110

[51] Int. Cl.$^5$ .............................................. C08G 18/71
[52] U.S. Cl. ..................................... 528/69; 252/351; 252/357
[58] Field of Search ................. 528/69; 252/351, 357

[56] References Cited

FOREIGN PATENT DOCUMENTS 54-37082 3/1979 Japan .
57-117330 7/1982 Japan .

Primary Examiner—Maurice J. Welsh
Attorney, Agent, or Firm—Arnold, White & Durkee

[57] ABSTRACT

The invention provides a pigment dispersing agent being a product obtained by reacting a component A of an amine compound having one or more active hydrogen atom per one molecule and a weight average molecular weight of 60~30,000 with at least one component B represented by the following general formula (I), (II) or (III):

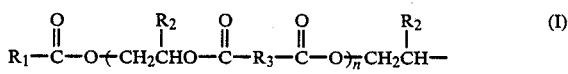

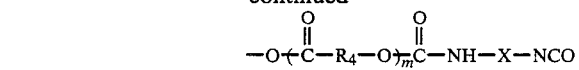

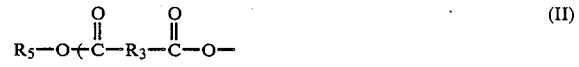

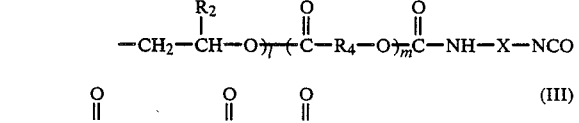

[wherein $R_1$ is an alkyl group having a carbon number of 1~20 or a residue of aromatic monocarboxylic acid, $R_2$ is a phenyl group, an alkyl group having a carbon number of 5~19,

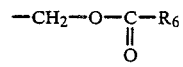

group ($R_6$ is an alkyl group or an aromatic group having a carbon number of 3~17) or —CH$_2$—O—R$_7$ group ($R_7$ is an alkyl group or an aromatic group having a carbon number of 4~18), $R_3$ is a residue of acid anhydride having a carbon number of 2~6, $R_4$ is an alkylene group having a carbon number of 1~7, $R_5$ is a residue of saturated aliphatic, alicyclic or aromatic monoalcohol having a carbon number of 1~18, X is a residue of saturated aliphatic alicyclic or aromatic diisocyanate having a carbon number of 6~20, each of n, l and p is an integer of 1~200, and m is an integer of 0~100 provided that 0≦m/n, m/l, m/p≦0.5], and a pigment dispersing agent being a product obtained by reacting the above reaction product with a component C of a polyisocyanate compound having two or more isocyanate groups.

4 Claims, No Drawings

PIGMENT DISPERSING AGENT

TECHNICAL FIELD

This invention relates to a pigment dispersing agent used when a pigment is mixed with a coating composition in the manufacture of paints.

BACKGROUND ART

In the manufacture of paints, it is important to mix the pigment with the coating composition In this case, the pigment is dispersed into a vehicle to form a dispersion paste, and then the paste is mixed with the coating composition to obtain a pigment dispersing composition. However, a greatest problem in such a pigment dispersing composition lies in that the pigment particles are apt to be agglomerated. This agglomeration may occur in the dispersion step, dissolution step, storing step or painting step. As a result, the gloss, sharpness and color strength of the finally obtained paint film are injured.

In order to improve the above drawbacks, therefore, there are proposed various pigment dispersing agents and grinding aids and also methods for improving dispersion of the pigment are attempted. For instance, there are known (1) a method of dispersing the pigment by using non-ionic, anionic or cationic surfactant or a wetting agent such as aliphatic polyvalent carboxylic acid or the like as a grinding aid; (2) a method of dispersing the pigment by using an amphipathic substance obtained by bonding a pigment-affinitive substance disclosed in British Pat. Nos. 1108261, 1159252 and 1346298 to a medium-affinitive substance; (3) a method of reducing surface tension with a surfactant such as alkyl silicone to prevent the occurrence of pigment floating; (4) a method of mixing the pigment with a certain substituted derivative of the pigment to conduct the dispersion of the pigment as disclosed in Japanese Patent laid open No. 51-18736; (5) a method of using as a dispersing agent a compound obtained by reacting an organic compound having two or more isocyanate groups, an organic compound having one or more functional group (amino group or hydroxyl group) capable of reacting with the isocyanate groups, and a polymer having substantially one functional group capable of reacting with the isocyanate group as disclosed in U.S. Pat. No. 3,684,771, British Pat. No. 1393401 and the like; (6) a method of dispersing the pigment by using a dispersing agent obtained by bonding a basic substance disclosed in European Patent laid open No. 208041, U.S. Pat. No. 4,647,647 and the like to a polyester compound; and the like.

However, the grinding aids or dispersing agents used in the methods (1)~(3) do not sufficiently improve the aforementioned drawbacks, and the harmful effects derived from the use of these agents, i.e. secondary evil influences of degrading the paint film performances or painted state should be encountered. The pigment derivative used in the method (4) is naturally colored, so that it can not generally be used. Further, the basic thought of the dispersing agent used in the methods (5) and (6) is a technical idea of making a block structure to a polymer portion capable of solvating with a solvent as described by A. Topham in Progress in Organic Coatings, vol. 5, (1977) pp 237~243. In this technique, it is important that the polymer portion capable of solvating with the solvent is excellent in the compatibility with a resin used as a film forming component of the paint film and has adsorption point to the pigment as much as possible. When the polymer portion capable of solvating with the solvent is poor in the compatibility with the resin added as a film forming component of the paint film, the solvated polymer portion agglomerates to cause the degradation of pigment dispersing performances. Further, when the number of adsorption points to the pigment is small, the desorption of the dispersing agent from the pigment is apt to be caused to degrade the pigment dispersing performances. From these reasons, it is most important how to make the polymer portion having excellent compatibility with a wide range of resins, and further how to give many adsorption points to the pigment. And also, the polymer portion solvating with the solvent is important to have one functional group reacting with the isocyanate group. Because, when the polymer portion has two or more functional group, the adsorption state of the pigment onto the dispersing agent tends to produce a loop form, and consequently the efficiency of steric stability of the solvated polymer portion becomes small as compared with the tail-like adsorption state in case of one functional group and the pigment dispersing performances are degraded. Therefore, it is unfavorable to use (A) a polyester compound obtained from dialcohol starting from monoalcohol and dicarboxylic acid in the polymer portion as disclosed in U.S. Pat. No. 3,684,771 and British Pat. No. 1393401 as a polymer component of the dispersing agent because such a polyester compound includes not only a polyester compound having substantially one hydroxyl group at its terminal but also polyester compounds having hydroxyl groups at both terminals or no hydroxyl group. For this end, almost of the polymer component in the dispersing agent are (B) polyester compounds obtained by starting from monoalcohol and ring-opening polymerizing with lactones, and (C) polyester compounds obtained by polycondensation of an acid having hydroxyl group such as α,ω-hydroxyl propionic acid, 12-hydroxy stearic acid or the like. An example of these reactions may be mentioned as follows:

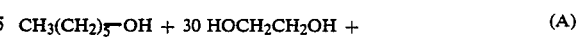 (A)

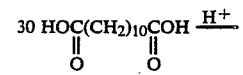

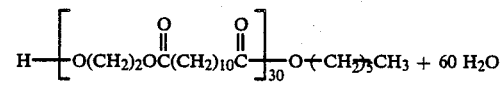

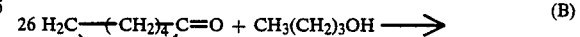 (B)

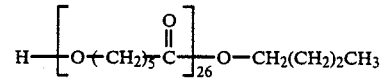

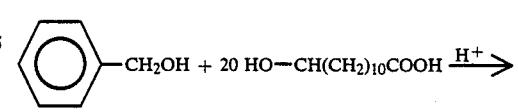 (C)

-continued

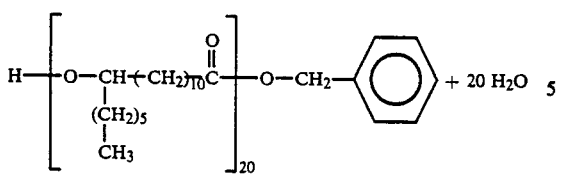

As the starting material in the reactions (B) and (C), there are restricted propiolactone, ε-caprolactone, valerolactone and the like in case of (B) and α,ω-hydroxy propionic acid, α,ω-hydroxy decanoic acid, 12-hydroxy stearic acid and the like, so that there is a problem that the range of compatibility of the dispersing agent is considerably limited.

DISCLOSURE OF INVENTION

The inventors have made various studies in order to solve the aforementioned problems and found a pigment dispersing agent capable of using in a very wide range of resins and having many adsorption points to the pigment in one molecule, and as a result the invention has been accomplished.

That is, a first aspect of the invention is concerned with a pigment dispersing agent being a product obtained by reacting a component A of an amine compound having one or more active hydrogen atom per one molecule and a weight average molecular weight of 60~30,000 with at least one component B represented by the following general formula (I), (II) or (III):

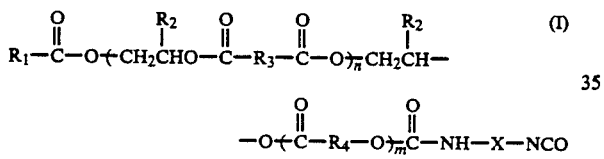

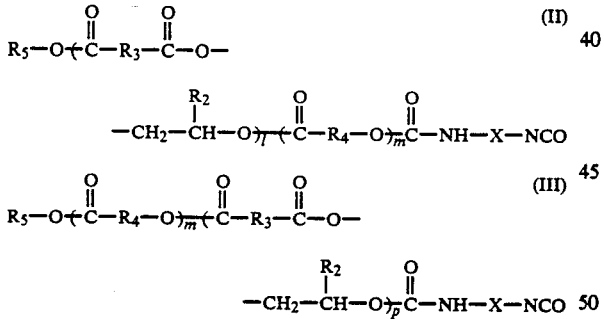

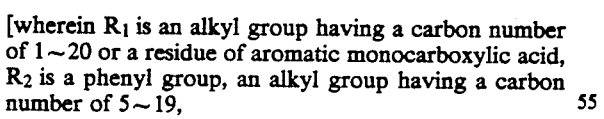

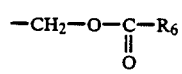

[wherein $R_1$ is an alkyl group having a carbon number of 1~20 or a residue of aromatic monocarboxylic acid, $R_2$ is a phenyl group, an alkyl group having a carbon number of 5~19, $$-CH_2-O-\underset{\underset{O}{\|}}{C}-R_6$$

group ($R_6$ is an alkyl group or an aromatic group having a carbon number of 3~17) or —$CH_2$—O—$R_7$ group ($R_7$ is an alkyl group or an aromatic group having a carbon number of 4~18), $R_3$ is a residue of acid anhydride having a carbon number of 2~6, $R_4$ is an alkylene group having a carbon number of 1~7, $R_5$ is a residue of saturated aliphatic, alicyclic or aromatic monoalcohol having a carbon number of 1~18, X is a residue of saturated aliphatic, alicyclic or aromatic diisocyanate having a carbon number of 6~20, each of n, l and p is an integer of 1~200, and m is an integer of 0~100 provided that $0 \leq m/n, m/l, m/p \leq 0.5$].

Further, a second aspect of the invention is concerned with a pigment dispersing agent being a product obtained by reacting a reaction product between a component A of an amine compound having one or more active hydrogen atom per one molecule and a weight average molecular weight of 60~30,000 and at least one component B represented by the following general formula (I), (II) or (III):

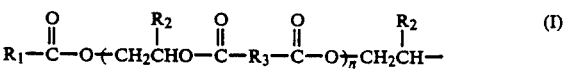

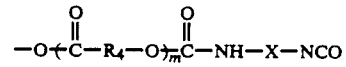

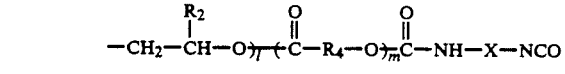

[wherein $R_1$ is an alkyl group having a carbon number of 1~20 or a residue of aromatic monocarboxylic acid, $R_2$ is a phenyl group, an alkyl group having a carbon number of 5~19, $$-CH_2-O-\underset{\underset{O}{\|}}{C}-R_6$$

group ($R_6$ is an alkyl group or an aromatic group having a carbon of 3~17) or —$CH_2$—O—$R_7$ group ($R_7$ is an alkyl group or an aromatic group having a carbon number of 4~18), $R_3$ is a residue of acid anhydride having a carbon number of 2~6, $R_4$ is an alkylene group having a carbon number of 1~7, $R_5$ is a residue of saturated aliphatic, alicyclic or aromatic monoalcohol having a carbon number of 1~18, X is a residue of saturated aliphatic, alicyclic or aromatic diisocyanate having a carbon number of 6~20, each of n, l and p is an integer of 1~200, and m is an integer of 0~100 provided that $0 \leq m/n, m/l, m/p \leq 0.5$] with a component C of a polyisocyanate compound having two or more isocyanate groups.

In the pigment dispersing agent of the first invention, the amine compound of component A strongly adsorbs onto the surface of the pigment, while the component B forms a steric repelling layer to have an effect of preventing the agglomeration of the pigment. Further, the component B is excellent in the compatibility with the wide range of the resins. Therefore, the pigment dispersing agents according to the invention are excellent in the pigment dispersability as compared with the conventional pigment dispersing agent and can be applied to the wide range of resins. Further, the method of obtaining the component B in the pigment dispersing agent according to the invention is a peculiar method as compared with the conventional pigment dispersing agent, so that the range of the compatibility of the dispersing agent is widened. Moreover, the pigment dispersing agent of the second invention is obtained by reacting the component A with the component B and then reacting with the component C, so that it is easily possible to increase the number of adsorption points included in one molecule of the dispersing agent to the pigment, which is difficult in the first invention, and consequently the latter pigment dispersing agent is excellent in the pigment dispersability and the time-sequantial dispersion stability and can be applied to the wide range of resins.

BEST MODE OF CARRYING OUT THE INVENTION

The pigment dispersing agent according to the invention will be described in detail below.

The component A in the pigment dispersing agent is an amine compound having one or more active hydrogen atom per one molecule, which may be heterocyclic, branched or straight chain and has a weight average molecular weight of 60~30,000. When the weight average molecular weight is less than 60, the adsorbing force to the pigment is weak and the sufficient pigment dispersability is not obtained. On the other hand, when it exceeds 30,000, the compatibility with the dispersing resin is poor and the pigment dispersability lowers.

The component B in the pigment dispersing agent is a polyester compound having an isocyanate group in its terminal and represented by the following general formula (I), (II) or (III):

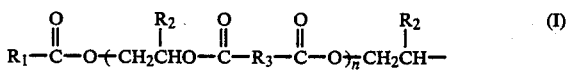

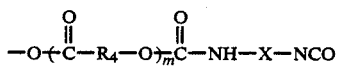

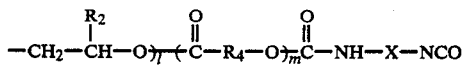

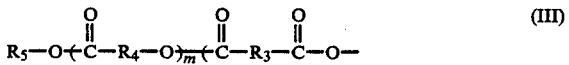

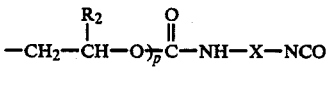

[wherein $R_1$ is an alkyl group having a carbon number of 1~20 or a residue of aromatic monocarboxylic acid, $R_2$ is a phenyl group, an alkyl group having a carbon number of 5~19,

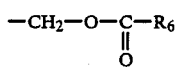

group ($R_6$ is an alkyl group or an aromatic group having a carbon number of 3~17) or $-CH_2-O-R_7$ group ($R_7$ is an alkyl group or an aromatic group having a carbon number of 4~18), $R_3$ is a residue of acid anhydride having a carbon number of 2~6, $R_4$ is an alkylene group having a carbon number of 1~7, $R_5$ is a residue of saturated aliphatic, alicyclic or aromatic monoalcohol having a carbon number of 1~18, X is a residue of saturated aliphatic, alicyclic or aromatic diisocyanate having a carbon number of 6~20, each of n, l and p is an integer of 1~200, and m is an integer of 0~100 provided that $0 \leq m/n$, $m/l$, $m/p \leq 0.5$], and has a weight average molecular weight of 1,000~80,000. When the weight average molecular weight is less than 1,000, the sufficient steric repelling layer is not formed and the pigment dispersability lowers. On the other hand, when it exceeds 80,000, the desorption of the pigment dispersing agent from the pigment surface is apt to be caused, and the degradation of pigment dispersability occurs.

In the polyester compound, m, n, l and p satisfy the condition of $0 \leq m/n$, $m/l$, $m/p \leq 0.5$. If m/n, m/l and m/p exceed 0.5, the polymer component of lactones in the polyester compound becomes larger, and the dispersing resin is waxy due to the properties of the lactone polymer and consequently the handling is very inconvenient.

There are three methods for the production of the component B, i.e. (I) when monocarboxylic acid is used as an initiator, monoepoxy compound is first reacted with monocarboxylic acid to open oxirane ring and form secondary hydroxyl group. Then, acid anhydride is ring-opened by the resulting secondary hydroxyl group to produce carboxyl group. The resulting carboxyl group reacts with epoxy group to repeat the growth reaction. Thus, the lactone is ring-opened and added, if necessary.

(II) when monovalent alcohol is used as an initiator, the ring opening reaction of acid anhydride is caused by hydroxyl group of the monovalent alcohol, and then the resulting carboxyl group reacts with epoxy group to produce secondary hydroxyl group. Further, the ring opening reaction of acid anhydride is caused by the resulting hydroxyl group to repeat the growth reaction. Thus, the lactone is ring-opened and added, if necessary.

(III) lactone is ring-opened and added by using monovalent alcohol as an initiator, if necessary, and acid anhydride is ring-opened by terminal hydroxyl group to produce carboxyl group. Then, the resulting carboxyl group reacts with epoxy group to repeat the growth reaction. In this way, the reaction of polyester formation successively proceeds by the above three methods, so that an intermediate of polyester having always a terminal hydroxyl group is obtained. Then, it reacts with diisocyanate to obtain a polyester compound having a terminal isocyanate group. Thus, the compatible range of the dispersing agent becomes very wide by changing the kind of monovalent alcohol, monocarboxylic acid, monoepoxy compound, acid anhydride and lactone in the component B, whereby the dispersing agent having an excellent compatibility with the wide range of resins is obtained.

Moreover, the component C used in the pigment dispersing agent is a polyisocyanate compound having two or more isocyanate groups. By reacting it with the reaction product of the components A and B, it is easily possible to increase the number of adsorption points included in one molecule of the dispersing agent to the pigment, which is difficult in the conventional method, and the dispersing agent having very excellent pigment dispersability and time-sequential dispersion stability is obtained.

Then, the invention will be described with respect to the production of the pigment dispersing agent.

At first, there are the following three methods as a method of obtaining the component B. That is, in the first method, monocarboxylic acid represented by $R_1$—COOH, for example, at least one compound having an alkyl group with a carbon number of $1 \sim 20$ and selected from the group consisting of acetic acid, propionic acid, caprylic acid, nonanic acid, capric acid, lauric acid, myristic acid, palmitic acid, stearic acid, isononanic acid, 2-ethylhexanoic acid, arachic acid, and aromatic monocarboxylic acids such as benzoic acid, p-tert-butyl benzoic acid and the like is esterified with a monoepoxy compound represented by

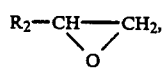

for example, at least one compound selected from the group consisting of styrene oxide having a phenyl group; phenylglycidyl ether p-tolylglycidyl ether, n-butylglycidyl ether and dibromocredylglycidyl ether having a glycidyl ether group with an alkyl or aromatic group having a carbon number of $4 \sim 18$; lauric acid glycidyl ester, stearic acid glycidyl ester, versatic acid glycidyl ester and p-tert-butyl benzoic acid glycidyl ester having a glycidyl ester group with an alkyl or aromatic group having a carbon number of $3 \sim 17$; α-olefin oxide having an alkyl group with a carbon number of $5 \sim 19$ and the like at $100° \sim 180°$ C., preferably 120 160° C., and then secondary hydroxyl group produced by this esterification reaction is esterified with an acid anhydride represented by

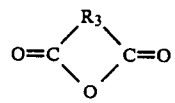

($R_3$ has a carbon number of $2 \sim 6$), for example, at least one compound selected from the group consisting of phthalic anhydride, succinic anhydride, hexahydrophthalic anhydride, tetrabromophthalic anhydride, tetrachlorophthalic anhydride, hymic anhydride, maleic anhydride, hetic anhydride and the like at $100° \sim 180°$ C., preferably $120° \sim 160°$ C. to obtain a reaction intermediate having a carboxyl group in its molecule terminal. Next, the carboxyl group of this reaction intermediate is esterified with a monoepoxy compound represented by

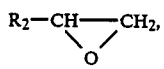

under the above conditions. Such reactions are repeated $1 \sim 200$ times, whereby an intermediate of first polyester having a desired molecular weight and a hydroxyl group in its molecule terminal. If necessary, the intermediate of the first polyester is subjected to ring opening and addition reaction with a lactone selected from the group consisting of ε-caprolactone, propiolactone, valerolactone and the like at $100° \sim 180°$ C., represented by

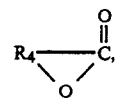

for example, at least one compound preferably $120° \sim 160°$ C. to obtain an intermediate of polyester having a hydroxyl group in its molecule terminal. Next, the thus obtained polyester intermediate is reacted with one isocyanate group of a diisocyanate compound represented by OCN—X—NCO such as tolylene diisocyanate, isophorone diisocyanate, 4,4'-diphenylmethane diisocyanate, hexamethylene diisocyanate, lysine diisocyanate, methylcyclohexane-2,4(2,6) diisocyanate, 4,4'-methylenebis (cyclohexylisocyanate), 1,3-(isocyanatemethyl) cyclohexane, trimethylhexamethylene diisocyanate, dimer acid diisocyanate or the like at $30° \sim 80°$ C. to obtain a polyester compound having an isocyanate group in its molecule terminal as a component B.

In the second method, monovalent alcohol represented by $R_5$—OH, for example, at least one compound selected from the group consisting of saturated aliphatic alcohols having a carbon number of $1 \sim 18$, such as methyl alcohol, ethyl alcohol, n-propyl alcohol, isopropyl alcohol, n-butyl alcohol, isobutyl alcohol, t-butyl alcohol, amyl alcohol, n-hexyl alcohol, n-heptyl alcohol, 2-ethylhexyl alcohol, lauryl alcohol and stearyl alcohol; alicyclic alcohols such as cyclopentanol and cyclohexanol; aromatic alcohols such as benzyl alcohol and p-tert-butyl benzyl alcohol is esterified with the aforementioned acid anhydride represented by

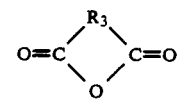

at $100° \sim 180°$ C., preferably $120° \sim 160°$ C. to obtain a reaction intermediate having a carboxyl group in its molecule terminal. Then, an intermediate of first polyester having a desired molecular weight and a hydroxyl group in its molecule terminal is obtained by repeating the esterification reaction of the above reaction intermediate with the aforementioned monoepoxy compound represented by

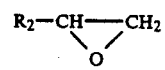

and further with acid anhydride represented by

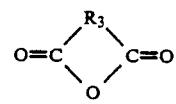

$1 \sim 200$ times in the same manner as as in the first method. Thereafter, a polyester intermediate having a hydroxyl group in its molecule terminal is obtained by ring-opening and adding a lactone, if necessary, in the same manner as in the first method. Next, this polyester intermediate is reacted with one isocyanate group of the aforementioned diisocyanate compound represented by OCN—X—NCO at $30° \sim 80°$ C. to obtain a polyester compound having an isocyanate group in its molecule terminal as a component B.

In the third method, the aforementioned monovalent alcohol represented by R₅—OH and the aforementioned lactone represented by

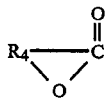

are ring-opened and added at 10°~180° C., preferably 120°~160° C., if necessary, to obtain a polylactone intermediate having a hydroxyl group in its molecule terminal. Then, a polyester intermediate having a desired molecular weight and a hydroxyl group in its molecule terminal is obtained by repeating the esterification reaction of the above reaction intermediate with the aforementioned acid anhydride represented by

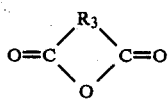

and further with a monoepoxy compound represented by

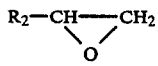

1~200 times in the same manner as in the second method. Next, this polyester intermediate is reacted with one isocyanate group of the aforementioned diisocyanate compound represented by OCN—X—NCO at 30°~80° C. to obtain a polyester compound having an isocyanate group in its molecule terminal as a component B.

Then, the component B of the polyester compound having an isocyanate group in its molecule terminal is mixed with the component A of the amine compound having one or more active hydrogen atom per one molecule and a weight average molecular weight of 60~30,000, for example, alkylmonoamines such as butylamine, pentylamine, heptylamine, octylamine, nonylamine, decylamine and the like; alkylpolyamines such as ethylene diamine, tetramethylene diamine, pentamethylene diamine, hexamethylene diamine, octamethylene diamine, 1,2,3-triamino propane, tris(2-aminoethyl) amine, tetra(aminomethyl) methane and the like; polyethylene imines such as diethylene triamine, triethylene tetramine, tetraethylene pentamine, heptaethylene octamine, nonaethylene decamine, Montorec (trade name, made by Dow Chemical Co.), Polymine Water Flow (trade name, made by Basf AG), SP-003, SP-006, SP-012, SP-018, SP-200, SP-300, SP-103, SP-110 (trade name, made by Nippon Shokubai Kagaku Kogyo K.K.) and the like; cyclodialkylenediimines such as 1,4-diazacycloheptane, cyclodi(trimethylene) diimine, cyclodi(heptamethylene) diimine, cyclodi(octamethylene) diimine and the like; aminoalcohols such as ethanol amine, diethanol amine, N,N-dimethylethanol amine, N,N-diethylethanol amine, N-methalethanol amine and the like; heterocyclic amines such as morpholine, N-methyl morpholine, N-ethyl morpholine, N-aminopropyl morpholine, 1-(2-aminoethyl)pyperadine, 4-amino-2-methoxy-pyrimidine, 1-(2-hydroxyethyl) pyperadiene, 4-(aminoethyl) pyridine, 2-mercapto pyrimidine, 2-amino-6-methoxy benzothiazole, N,N-diallyl-melamine, benzoguanamine, 1-(3-aminopropyl)imidazole, 1,2-(hydroxyethyl)-imidazole and the like; and other amines such as dimethylaminopropyl amine, diethylaminopropyl amine and the like at a mol ratio of component B/component A of 1:1~200:1 and reacted at 30°~80° C. to obtain a pigment dispersing agent. When the mol ratio of component B/component A is less than 1:1, the sufficient steric repelling layer is not formed and the pigment dispersability degrades. Further, when the mol ratio of component B/component A exceeds 200:1, the desorption of the pigment dispersing agent from the pigment surface is apt to be caused and the degradation of the pigment dispersability occurs.

Moreover, when mol number of active hydrogen atom in the component A is a and mol number of the component B is b, the components A and B are mixed in such a ratio that b is 1~a to the component A, and reacted at 30°~80° C. Then, it is mixed with the component C of polyisocyanate compound having two or more isocyanate groups in such a ratio that the component C is 0~(a-b) to the components A and B when mol number of isocyanate group in the component C is c, and reacted at 30° C.~80° C. to obtain a pigment dispersing agent. As the polyisocyanate compound, mention may be made, for example, of diisocyanate compounds such as tolylene diisocyanate, isophorone diisocyanate, 4,4'-diphenylmethane diisocyanate, hexamethylene diisocyanate, lysine diisocyanate, methylcyclohexane-2,4(2,6) diisocyanate, 4,4'-methylene bis(cyclohexylisocyanate), 1,3-(isocyanatemethyl) cyclohexane, trimethylhexane methylene diisocyanate, dimer acid diisocyanate and the like, but polyfunctional polyisocyanate compounds are more advantageous. As the latter compounds, there are compounds obtained by reacting polyol with diisocyanate, e.g. compounds represented by the following formulae (1)~(4); compounds obtained by biuret reaction of diisocyanate, e.g. compounds shown by the following formula (5); compounds obtained by ring formation of diisocyanate, e.g. compounds shown by the following formulae (6)~(8); and compounds shown by the following formulae (9) and (10).

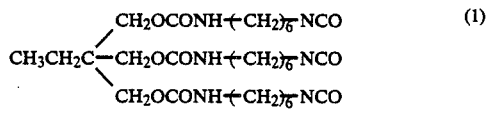
(1)

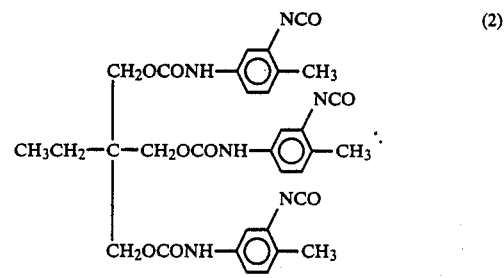
(2)

-continued
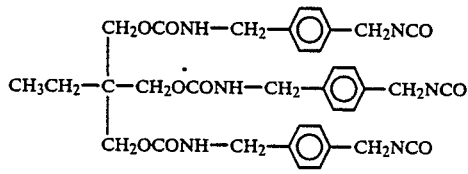 (3)
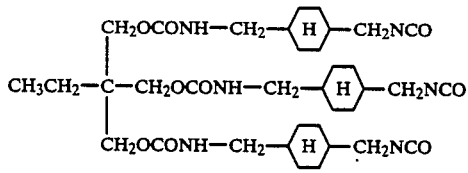 (4)
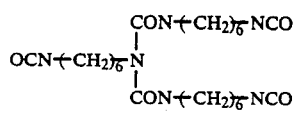 (5)
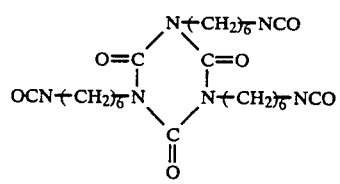 (6)
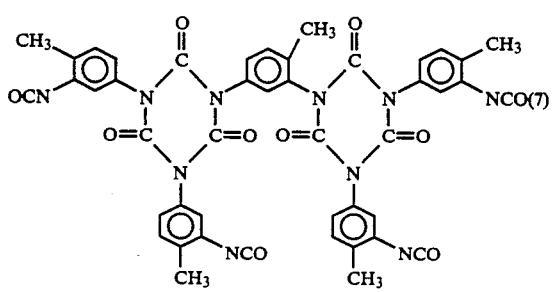 (7)
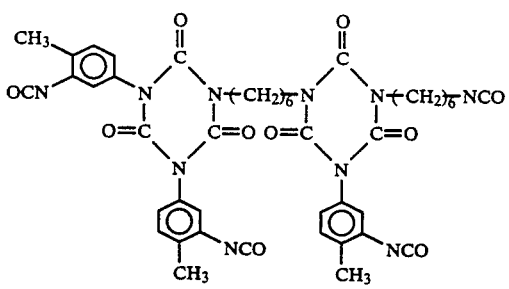 (8)
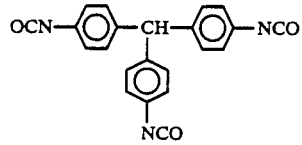 (9)
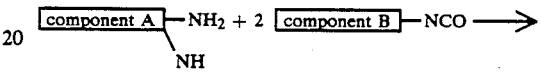 (10)
(1) The components A and B in the pigment dispersing agent according to the invention are bonded by urea bond shown as follows:
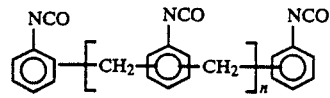
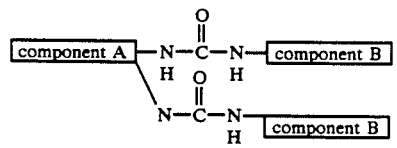
or by urethane bond shown as follows:
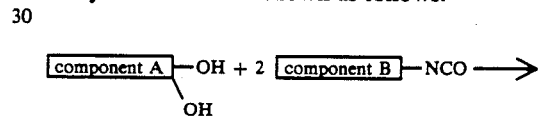
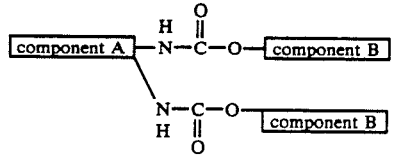
(2) The components A, B and C in the pigment dispersing agent according to the invention are bonded by urea bond shown as follows:
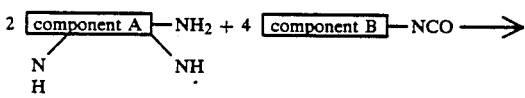
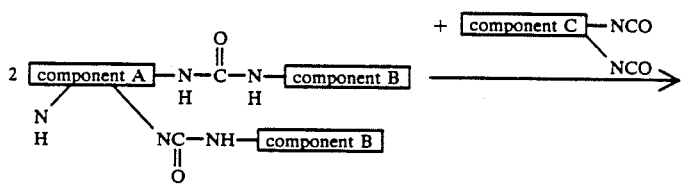

-continued

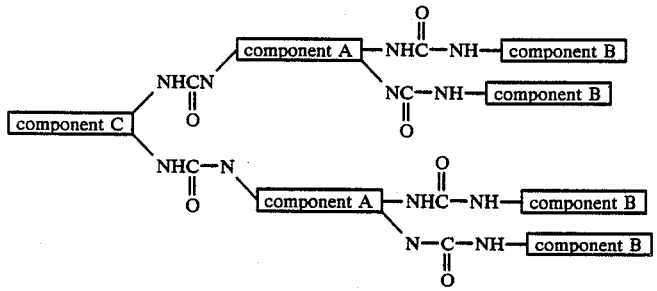

or by urea bond and urethane bond shown as follows:

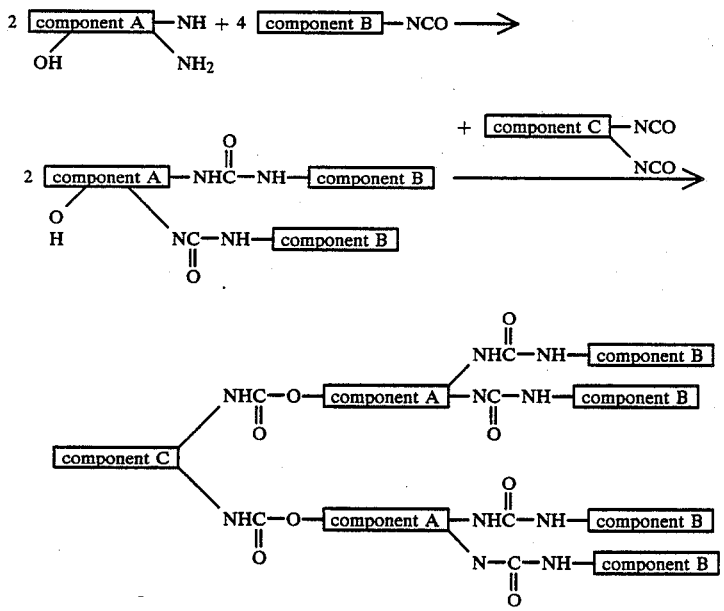

All of the reaction products are light yellow, transparent and viscous liquids.

The dispersing resin applied to the pigment dispersing agent according to the invention extends over a wide range of resins, and includes, for example, alkyd resins, oil-free polyester resins, acrylic resins, epoxy resins, polyurethane resins, silicone resins, fluorine resins, melamine resins, benzoguanamine resins, urea resins and the like. Further, the pigment used in the invention includes inorganic pigments such as titanium dioxide, zinc oxide, cadmium sulfide, iron oxide, zinc white, red lead, zinc sulfide, barium sulfate, carbon black, barium carbonate and the like; and organic pigments such as azo compound, diazo compound, condensed azo compound, thioindigo compound, indantorone, isoindantorone, anthratorone, anthraquinone, benzimidazorone, phthalocyanine, quinacridone, pyranthrone, isoindrinone, perillene, anthrapyridine, furavanthrone and the like. The pigment dispersing agent according to the invention exhibits an excellent pigment dispersability against these pigments.

In the pigment dispersion base composition using the pigment dispersing agent according to the invention, the pigment dispersing agent is added to the pigment in an amount of 0.01~500% by weight, preferably 0.1~200% by weight and then mixed with at least one of the above dispersing resins, and if necessary, added with at least one solvent usually used in the paint industry, for example, a hydrocarbon solvent such as toluene, xylene, Solveso #100 or Solveso #150, trade name made by Esso Standard Sekiyu K.K., an ester solvent such as ethyl acetate, butyl acetate or the like, a ketone solvent such as methylethyl ketone, methylisobutyl ketone or the like, which are placed in a dispersing machine used in the production of ordinary paint such as roll mill, ball mill, sand grind mill, attritor, kneader, paint shaker, high speed dispersing machine or the like to disperse the pigment.

When the amount of the pigment dispersing agent added to the pigment is less than 0.01% by weight, the sufficient pigment dispersability is not obtained. On the other hand, when it exceeds 500%, the pigment dispersing agent not adsorbed onto the pigment surface freely remains, and the pigment dispersability lowers.

The thus obtained pigment dispersion base composition exhibits a very good pigment dispersability and is usable as a pigment dispersion base composition.

The reason why the pigment dispersing agent comprising a product obtained by reacting the components A and B or the pigment dispersing agent comprising a product obtained by reacting the reaction product of the component A and B with the component C according to the invention is very excellent in the pigment dispersability and can be applied to the wide range of dispersing resins is considered to be due to the fact that the amine compound of the component A conducts a strong adsorption to the pigment surface and the polyester group of the component B forms a sufficiently steric repelling layer and is excellent in the compatibility with the wide range of the dispersing resins.

The invention will be described with reference to synthesis examples, examples, comparative examples, application examples and application comparative examples. In these examples, "part" and "%" are by weight.

SYNTHESIS EXAMPLE 1

<Production of alkyd resin>

Into a reaction vessel provided with a cooling tube, an inlet for nitrogen gas, a thermometer and a stirring blade was charged a starting material having the following composition, which was heated with stirring.

| | |
|---|---|
| lauric acid | 70 parts |
| Cardula E-10 | 130 parts |
| isophthalic acid | 340 parts |
| phthalic anhydride | 90 parts |
| adipic acid | 25 parts |
| neopentyl glycol | 200 parts |
| trimethylol propane | 115 parts |
| xylene | 30 parts |

The water produced with the advance of the reaction was removed together with xylene under boiling, and then the heating was continued to an acid value of 10 and a hydroxyl value of 100, and thereafter the reaction was stopped. The obtained resin liquid was diluted with xylene so as to provide a volatile content of 60%, whereby an alkyd resin was obtained. The obtained varnish had a Gardner viscosity of S.

SYNTHESIS EXAMPLE 2

<Production of acrylic resin>

Into a reaction vessel provided with a cooling tube, an inlet for nitrogen gas, a thermometer, a stirring blade and a dropping funnel was charged 400 parts of xylene and the temperature was raised to 130°~140° C. while blowing nitrogen gas. Then, a mixture of 248 parts of methylmethacrylate, 150 parts of butylmethacrylte, 100 parts of styrene, 85.2 parts of 2-hydroxyethyl methacrylate, 10.8 parts of acrylic acid and 6.0 parts of t-butyl peroxybenzoate was added dropwise through a dropping funnel over 2 hours, and further the stirring was continued at 130°~140° C. for 5 hours. Next, the temperature was cooled to room temperature to obtain an acrylic resin. This varnish had a Gardner viscosity of V.

EXAMPLE 1

Into a reaction vessel provided with a cooling tube, an inlet for nitrogen gas, a thermometer and a stirring blade were charged 400 parts of xylene, 59.4 parts of lauric acid, 222.8 parts of Cardula E-10 (glycidylester of versatic acid, epoxy equivalent 250, made by Yuka Shell Epoxy K.K., trade name) and 87.9 parts of phthalic anhydride, and then the temperature was raised to 150°~160° C. and the stirring was continued in nitrogen gas atmosphere for 5~8 hours. When the acid value of the resin was not more than 2.0, the temperature was dropped to 20°~30° C., and then 51.7 parts of tolylene diisocyanate was added and the stirred at 40° C. for 5~8 hours. Then, when 50% of the isocyanate group was reacted, 178.2 parts of SP-006 (trade name, made by Nippon Shokubai Kagaku Kogyo K.K.) and stirred at 30° C. for 5 hours to obtain a pigment dispersing agent (1) of Example 1. The properties of the thus obtained pigment dispersing agent (1) are shown in Table 1.

EXAMPLES 2~13, COMPARATIVE EXAMPLES 1~5

Pigment dispersing agents (2)~(13) and (26)~(30) of Examples 2~13 and Comparative Examples 1~5 were produced by using the starting components shown in Table 1 in the same manner as in Example 1. The properties of these dispersing agents are also shown in Table 1.

EXAMPLE 14

Into a reaction vessel provided with a cooling tube, an inlet for nitrogen gas, a thermometer, a stirring blade and a dropping funnel were charged 400 parts of xylene, 43.9 parts of lauric acid, 164.6 parts of Cardula E-10 (glycidylester of versatic acid, epoxy equivalent 250, made by Yuka Shell Epoxy K.K., trade name) and 65.0 parts of phthalic anhydride, which was raised to a temperature of 150°~160° C. and stirred in nitrogen gas atmosphere for 5~8 hours. When the acid value of the resin was not more than 1.0, 25.0 parts of ε-caprolactone and 0.1 part of dibutyltin dilaurate were added and stirred at 140°~160° C. for 5~8 hours. After the temperature was cooled to 20°~30° C., 38.2 parts of tolylene diisocyanate was added and stirred at 40° C. for 5~8 hours. When 50% of the isocyanate group was reacted, 131.7 parts of SP-006 (trade name, made by Nippon Shokubai Kagaku Kogyo K.K.) was added and stirred at 30° C. for 5 hours. Then, 131.7 parts of Coronate EH (trade name, made by Nippon Polyurethane Kogyo K.K.) was added and stirred at 30° C. for 5 hours to obtain a pigment dispersing agent (14) of Example 14. The properties of the thus obtained pigment dispersing agent (14) are shown in Table 2.

EXAMPLES 15~22

Pigment dispersing agents (15)~(22) of Examples 15~22 were produced by using the starting components shown in Table 2 in the same manner as in Example 14. The properties of these dispersing agents are shown in Table 2.

EXAMPLE 23

Into a reaction vessel provided with a cooling tube, an inlet for nitrogen gas, a thermometer, a stirring blade and a dropping funnel were charged 400.0 parts of xylene, 0.1 part of dibutyltin dilaurate and 7.1 parts of 2-ethyl hexanol, which was raised to a temperature of 140° C. and added dropwise with 62.2 parts of ε-caprolactone from the dropping funnel in nitrogen gas atmosphere over 3 hours. After the completion of the addition, the stirring was continued at 140° C. for 5~6 hours. Then, 341.1 parts of Cardula E-10 and 136.4 parts of succinic anhydride were charged thereto, which was stirred at a temperature of 150°~160° C. for 5~8 hours and then cooled to 20°~30° C. when the acid value of the resin was not more than 1.0. Next, 9.5 parts of tolylene diisocyanate was added and stirred at 40° C. for 5~8 hours. When 50% of the isocyanate group was reacted, 32.7 parts of SP-018 (trade name, made by Nippon Shokubai Kagaku Kogyo K.K.) was added and stirred at 30° C. for 5 hours. Then, 10.9 parts of Coronate EH (trade name, made by Nippon Polyurethane Kogyo K.K.) and stirred at 30° C. for 5 hours to obtain a pigment dispersing agent (23) of Example 23. The properties of the thus obtained pigment dispersing agent (23) are shown in Table 2.

EXAMPLES 24, 25

Pigment dispersing agents (24) and (25) of Examples 24 and 25 were produced by using the starting components shown in Table 2 in the same manner as in Example 23. The properties of these dispersing agents are shown in Table 2.

COMPARATIVE EXAMPLES 6~9

Pigment dispersing agents (31)~(34) of Comparative Examples 6~9 were produced by using the starting components shown in Table 2 in the same manner as in Example 14. The properties of these dispersing agents are shown in Table 2.

APPLICATION EXAMPLE 1

A pigment was dispersed in a paint shaker (trade name, made by Red Devil Co.) by using the pigment dispersing agent (1) obtained in Example 1 according to the dispersion compounding recipe shown in Table 2 to obtain a dispersion paste. The viscosity and storage stability of the obtained dispersion paste were measured. The results are shown in Table 2. Then, a paint was prepared by using the dispersion paste according to a paint compounding recipe shown in Table 2 and diluted with a thinner (celosolve acetate/xylene=50/50% mixed solvent) so as to adjust a viscosity to 20 seconds (25° C.) through Ford Cup No. 4, which was applied by spraying to a steel sheet (JIS G3141) and then baked at 140° C. for 30 minutes to obtain a test specimen. The specular gloss at 30° of the thus obtained test specimen (Dorigon goniophotometer, made by Hunter Laboratories) was measured. The result is shown in Table 3.

APPLICATION EXAMPLES 2~25

The dispersion was carried out according to a dispersion compounding recipe in the same manner as in Application Example 1 to obtain a dispersion paste. The viscosity and storage stability of the obtained dispersion paste were measured. The results are shown in Table 3. A paint was prepared by using the dispersion paste according to a paint compounding recipe shown in Table 3, from which test specimen was made in the same manner as in Application Example 1 and its specular gloss at 30° was measured. The result is shown in Table 3.

APPLICATION COMPARATIVE EXAMPLES 1~7 AND 9~14

The dispersion was carried out according to a dispersion compounding recipe in the same manner as in Application Example 1 to obtain a dispersion paste. The viscosity and storage stability of the obtained dispersion paste were measured. The results are shown in Table 3. A paint was prepared by using the dispersion paste according to a paint compounding recipe shown in Table 3, from which a test specimen was made in the same manner as in Application Example 1 and its specular gloss at 30° was measured. The result is shown in Table 3.

APPLICATION COMPARATIVE EXAMPLE 8

Into a reaction vessel provided with a cooling tube, an inlet for nitrogen gas, a thermometer and a stirring blade were charged 809.6 parts of ε-caprolactone, 118.2 parts of lauric acid and 0.8 part of tetrabutyl titanate, which was stirred at 170°~180° C. in nitrogen gas atmosphere for 20 hours. After the cooling to room temperature, 71.4 parts of polyethylene imine ["Montrec 6" made by Dow Chemicals Co., trade name] and stirred at 110°~120° C. for 8 hours to obtain a pigment dispersing agent (35). Further, the dispersion was carried out in the same manner as Application Example 1 by using the dispersing agent (35) according to a dispersion compounding recipe shown in Table 3 to obtain a dispersion paste. The viscosity and storage stability of the obtained dispersion paste were measured. The results are shown in Table 3. A paint was prepared by using the dispersion paste according to a paint compounding recipe shown in Table 3, from which a test specimen was made in the same manner as in Application Example 1 and its specular gloss at 30° was measured. The result is shown in Table 3.

APPLICATION COMPARATIVE EXAMPLE 15

Into a reaction vessel provided with a cooling tube, an inlet for nitrogen gas, a thermometer, a stirring blade and a dropping funnel were charged 400 parts of xylene, 1.0 part of dibutyltin dilaurate and 17.5 parts of 2-ethylhexanol, which was raised to a temperature of 140° C. and stirred in nitrogen gas atmosphere. Then, 534.9 parts of ε-caprolactone was added dropwise through the dropping funnel over 3 hours and thereafter the stirring was continued for 5~8 hours. After the cooling to 20°~30° C., 23.4 parts of tolylene diisocyanate was added and stirred at 40° C. for 5~8 hours. When 50% of the isocyanate group was reacted, 9.8 parts of triethylene tetramine was added and stirred at 30° C. for 5 hours. Further, 13.4 parts of Coronate EH was added and stirred at 30° C. for 5 hours to obtain a pigment dispersing agent (36). Then, the dispersion was carried out by using the dispersing agent (36) according to a dispersion compounding recipe shown in Table 3 to obtain a dispersion paste. The viscosity and storage stability of the obtained dispersion paste were measured. The results are shown in Table 3. A paint was prepared by using the dispersion paste according to a paint compounding recipe shown in Table 3, from which a test specimen was made in the same manner as in Application Example 1 and its specular gloss at 30° was measured. The result is shown in Table 3.

APPLICATION COMPARATIVE EXAMPLE 16

Into a reaction vessel provided with a cooling tube, an inlet for nitrogen gas, a thermometer and a stirring blade were charged 100 parts of benzene and 59.2 parts of polycaprolactone using butyl alcohol as an initiator, and further 15.3 parts of 75% cellosolve acetate solution of

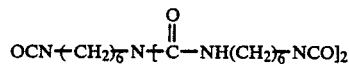

in nitrogen gas atmosphere. Then, 0.1 part of dibutyltin dilaurate was added and heated at 80° C. for 1 hour. Next, 2 parts of N,N-dimethylethylene diamine was added to obtain a pigment dispersing agent (37). The dispersion was carried out in the same manner as in Application Example 1 by using the dispersing agent (37) according to a dispersion compounding recipe shown in Table 3 to obtain a dispersion paste. The viscosity and storage stability of the obtained dispersion paste were measured. The results are shown in Table 3. A paint was prepared by using the dispersion paste according to a paint compounding recipe shown in Table 3, from which a test specimen was made in the same manner as in Application Example 1 and its specular gloss at 30° was measured. The result is shown in Table 3.

[Test Method]

Test for storage stability

The dispersion paste was left to stand at 50° C. for 5 days, during which the viscosities at initial day and after 5 days were measured at 20° C. by means of B type viscometer. Then, the storage stability was judged from a ratio of the measured viscosity values.

TABLE 1

| | | Example | | | | | | | | | |
|---|---|---|---|---|---|---|---|---|---|---|---|
| pigment dispersing agent No. | | 1 (1) | 2 (2) | 3 (3) | 4 (4) | 5 (5) | 6 (6) | 7 (7) | 8 (8) | 9 (9) | 10 (10) |
| Component B | xylene | 400 | 400 | 400 | 400 | 400 | 400 | 400 | 400 | 200 | 400 |
| | ethylcellosolve | | | | | | | | | 200 | |
| | Cardula E-10 (1) | 222.8 | 314.2 | 258.6 | 312.5 | | | | | 281.2 | 317.9 | 341.3 |
| | AOEX-24 (2) | | | | | | | 276.3 | | | |
| | (3) | | | | | 268.3 | 318.1 | | | | |
| | phenylglycidyl ether | | | | | | | | | | |
| | phthalic anhydride | 87.9 | 124.0 | | | 113.1 | 160.9 | | | 212.1 | 198.0 |
| | heterohydro phthalic anhydride | | | 107.6 | 130 | | | 181.4 | 175.5 | | |
| Component B | succinic anhydride | | | | | | | | | | |
| | lauric acid | 59.4 | 83.8 | | | 76.4 | 54.4 | | | 10.6 | 5.5 |
| | octylic acid | | | 49.7 | 60 | | | 33.5 | | | |
| | 2-ethyl hexanol | | | | | | | | 29.3 | | |
| | cyclohexyl alcohol | | | | | | | | | | |
| | p-t-butyl benzyl alcohol | | | | | | | | | | |
| | p-t-butyl benzoic acid | | | | | | | | | | |
| | tolylene diisocyanate | 51.7 | 72.9 | 60 | 72.5 | | 46.7 | | | | |
| | isophorone diisocyanate | | | | | 84.8 | | | 46.5 | 11.8 | |
| | hexamethylene diisocyanate | | | | | | | 39.1 | | | 6.1 |
| Component A | ethylamine (4) | | | | | | | | | | |
| | ethylene diamine 50 (5) | | 5.0 | | | | | | | | |
| | triethylene tetramine (6) | | | | | | 19.8 | | | | |
| | SP-006 (7) | 178.2 | | | | | | 69.8 | 67.5 | | |
| | SP-018 (8) | | | 124.1 | | | | | | 47.7 | 49.1 |
| | SP-300 (10) | | | | 25 | 57.3 | | | | | |
| | P-1000 (11) | | | | | | | | | | |
| Component A: component B (mol ratio) | | 1:1 | 1:5 | 1:10 | 1:100 | 1:200 | 1:2 | 1:2 | 1:2 | 1:2 | 1:2 |
| Weight average molecular weight of component B | | 1330 | 1330 | 1330 | 1330 | 1330 | 7850 | 1850 | 3200 | 6500 | 12000 |
| n | | 2 | 2 | 2 | 2 | 2 | 3 | 3 | 7 | 16 | 30 |
| properties | nonvolatile content (%) | 60 | 60 | 60 | 60 | 60 | 60 | 60 | 60 | 60 | 60 |
| | viscosity (25°) (13) | R | S | U | V | W | T | T | T | W | X |
| | weight average molecular weight | 1670 | 4080 | 7500 | 13200 | 16800 | 28900 | 3020 | 6700 | 12300 | 19800 |

| | | Example | | | Comparative Example | | | | |
|---|---|---|---|---|---|---|---|---|---|
| Pigment dispersing agent No. | | 11 (11) | 12 (12) | 13 (13) | 1 (26) | 2 (27) | 3 (28) | 4 (29) | 5 (30) |
| Component B | xylene | 400 | 399.8 | 400 | 400 | 400 | 400 | 400 | 400.0 |
| | ethylcellosolve | | | | | | | | |
| | Cardula E-10 (1) | | | | 149.7 | 307.2 | 70.1 | 171.8 | 316.5 |
| | AOEX-24 (2) | | | | | | | | |
| | (3) | | | | | | | | |
| | phenylglycidyl ether | 289.9 | 291.7 | 343.9 | | | | | |
| | phthalic anhydride | 286.0 | 284.0 | | 88.6 | 121.2 | 27.7 | 67.8 | 124.9 |
| | heterohydro phthalic anhydride | | | | | | | | |
| | succinic anhydride | | | 229.2 | | | | | |
| | lauric acid | | | | | 81.9 | 18.7 | 45.8 | 84.4 |
| | octylic acid | | | | | | | | |
| | 2-ethyl hexanol | | | | 77.8 | | | | |
| | cyclohexyl alcohol | | | 2.3 | | | | | |
| | p-t-butyl benzyl alcohol | 5.8 | | | | | | | |
| | p-t-butyl benzoic acid | | 4.6 | | | | | | |
| | tolylene diisocyanate | 6.7 | 4.5 | 4.0 | 104.2 | 71.3 | 16.3 | 39.8 | 73.4 |
| | isophorone diisocyanate | | | | | | | | |
| | hexamethylene diisocyanate | | | | | | | | |
| Component A | ethylamine (4) | | | | 18.4 | | | | |
| | ethylene diamine 50 (5) | | | | | | | | |
| | triethylene tetramine (6) | | | | | | | | |
| | SP-006 (7) | 11.6 | | | 179.6 | | | 274.8 | 0.9 |
| | SP-018 (8) | | 15.4 | 20.6 | | | | | |
| | SP-300 (10) | | | | | | | | |
| | P-1000 (11) | | | | | | 467.3 | | |
| component A: component B (mol ratio) | | 1:2 | 1:3 | 1:2 | 1.2 | 1:2 | 1:2 | 1:0.5 | 1:300 |
| Weight average molecular weight of component B | | 18500 | 21300 | 25600 | 450 | 1050 | 1060 | 1070 | 1080 |
| n | | | 75 | | | 2 | 2 | 2 | 2 |
| l | | 50 | | 100 | 1 | | | | |
| Properites | nonvolatile content (%) | 60 | 60.1 | 60 | 60 | 60 | 60 | 60 | 60 |
| | viscosity (25°) (13) | X | Y | Y | R | S | V | S | U |

TABLE 1-continued

| | | | | | | | | |
|---|---|---|---|---|---|---|---|---|
| weight average molecular weight | 28600 | 36500 | 35200 | 780 | 2230 | 13500 | 1350 | 4300 |

TABLE 2

| | | Example | | | | | | | |
|---|---|---|---|---|---|---|---|---|---|
| Pigment dispersing agent No. | | 14 (14) | 15 (15) | 16 (16) | 17 (17) | 18 (18) | 19 (19) | 20 (20) | 21 (21) |
| Component B | xylene | 400 | 400 | 400 | 400 | 400 | 400 | 400 | 400 |
| | Cardula E-10 (1) | 164.6 | 253.7 | | | 272.4 | 357.2 | | |
| | AOEX-24 (2) | | | | 207.4 | | | | |
| | (3) | | | 275.2 | | | | | |
| | phenylglycidyl ether | | | | | | | 266.8 | 271.3 |
| | phthalic anhydride | 64.8 | 100.0 | 130.4 | | | | 259.6 | 260.5 |
| | heterohydro phthalic anhydride | | | | 122.5 | 170.0 | | | |
| | succinic anhydride | | | | | | 138.3 | | |
| | lauric acid | 43.8 | 67.5 | 58.7 | | | 9.2 | | |
| | octylic acid | | | | 37.7 | | | | |
| | 2-ethyl haxanol | | | | | 20.2 | | | |
| | cyclohexyl alcohol | | | | | | | | |
| | p-t-butyl benzyl alcohol | | | | | | | 5.3 | |
| | p-t-butyl benzoic acid | | | | | | | | 4.2 |
| | ε-caprolactone | 25.0 | 38.6 | 33.5 | 29.8 | 17.7 | 63.0 | 40.6 | 40.7 |
| | dibutyltin dilaurate | 0.1 | 0.1 | 0.1 | 0.1 | 0.1 | 0.1 | 0.1 | 0.1 |
| | tolylene diisocyanate | 38.3 | 58.9 | 51.2 | 45.5 | | 8.0 | 6.2 | 4.1 |
| | hexamethylene diisocyanate | | | | | 26.2 | | | |

| | | Example | | | | Comparative Example | | | |
|---|---|---|---|---|---|---|---|---|---|
| Pigment dispersing agent No. | | 22 (22) | 23 (23) | 24 (24) | 25 (25) | 6 (31) | 7 (32) | 8 (33) | 9 (34) |
| Component B | xylene | 400 | 400 | 400 | 400 | 400 | 400 | 400 | 400 |
| | Cardula E-10 (1) | | 341.1 | 280.6 | 177.3 | | 347.0 | 341.6 | 219.6 |
| | AOEX-24 (2) | | | | 60.2 | | | | |
| | (3) | | | | | | | | |
| | phenylglycidyl ether | 311.4 | | | | 136.6 | | | |
| | phthalic anhydride | | | | 105.5 | | | | 118.1 |
| | heterohydro phthylic anhydride | | | | 47.4 | | 216.5 | | |
| | succinic anhydride | 207.5 | 136.4 | 112.1 | | 91.0 | | 136.6 | |
| | lauric acid | | | | | | | | 16.0 |
| | octylic acid | | | | | | | | |
| | 2-ethyl hexanol | | 7.1 | 14.6 | 13.2 | 59.2 | 0.9 | 17.8 | |
| | cyclohexyl alcohol | 1.2 | | | | | | | |
| | p-t-butyl benzyl alcohol | | | | | | | | |
| | p-t-butyl benzoic acid | | | | | | | | |
| | ε-caprolactone | 70.8 | 62.2 | 38.4 | 57.6 | 51.8 | 31.5 | 46.7 | 136.3 |
| | dibutyltin dilaurate | 0.1 | 0.1 | 0.1 | 0.1 | 0.1 | 0.1 | 0.1 | 0.1 |
| | tolylene diisocyanate | 2.0 | 9.5 | 19.5 | 17.6 | 79.2 | 1.2 | 23.8 | 13.9 |
| | hexamethylene diisocyanate | | | | | | | | |

| | | Example | | | | | | | |
|---|---|---|---|---|---|---|---|---|---|
| | | 14 | 15 | 16 | 17 | 18 | 19 | 20 | 21 |
| Component A | ethylamine (4) | | | | | | | | |
| | ethylene diamine (5) | | | | | | | | |
| | triethylene tetramine (6) | | | 21.5 | | | | | |
| | SP-006 (7) | 131.7 | | | 78.5 | 46.7 | | 10.7 | |
| | SP-018 (8) | | 60.9 | | | | | | 14.3 |
| | SP-200 (9) | | | | | | 23.0 | | |
| | SP-300 (10) | | | | | | | | |
| Component C | Coronate EH (12) | 131.7 | 20.3 | 29.4 | 78.5 | 46.7 | | 10.7 | 4.8 |
| | tolylene diisocyanate | | | | | | 1.2 | | |
| Weight average molecular weight of component B | | 1530 | 1500 | 1820 | 2200 | 3450 | 13400 | 19800 | 23500 |
| n, l, p | | n, 2 | n, 2 | n, 3 | n, 3 | l, 7 | n, 30 | l, 50 | n, 75 |
| m | | 1 | 1 | 1 | 1 | 1 | 12 | 10 | 15 |
| m/n, m/l, m/p | | 0.5 | 0.5 | 0.33 | 0.33 | 0.14 | 0.4 | 0.2 | 0.2 |
| Properites | nonvolatile content (%) | 60 | 60 | 60 | 60 | 60 | 60 | 60 | 60 |
| | viscosity (25° C.) | S | W | S | T | U | Z | W | X |
| | weight average molecular weight | 4030 | 20500 | 4330 | 6330 | 19000 | 506300 | 53000 | 73200 |

| | | Example | | | | Comparative Example | | | |
|---|---|---|---|---|---|---|---|---|---|
| | | 22 | 23 | 24 | 25 | 6 | 7 | 8 | 9 |
| Component A | ethylamine (4) | | | | | | | 6.1 | |
| | ethylene diamine (5) | | | | | | | | |
| | triethylene tetramine (6) | | | | | | | | |
| | SP-006 (7) | 3.5 | | | | 136.6 | 2.1 | | |
| | SP-018 (8) | | 32.7 | 101.0 | 91.2 | | | | 71.9 |
| | SP-200 (9) | | | | | | | | |
| | SP-300 (10) | | | | | | | | |
| Component C | Coronate EH (12) | 3.5 | 10.9 | 33.7 | 30.4 | 45.5 | 0.7 | 27.3 | 24.0 |
| | tolylene diisocyanate | | | | | | | | |
| Weight average molecular weight of component B | | 52300 | 10300 | 3400 | 10200 | 920 | 93500 | 4000 | 6250 |
| n, l, p | | l, 180 | p, 25 | p, 10 | p, 10 | l, 2 | l, 200 | l, 10 | n, 10 |

TABLE 2-continued

| | | | | | | | | |
|---|---|---|---|---|---|---|---|---|
| m | 54 | 10 | 3 | 5 | 1 | 40 | 3 | 15 |
| m/n, m/l, m/p | 0.3 | 0.4 | 0.3 | 0.5 | 0.5 | 0.2 | 0.3 | 1.5 |
| Properties nonvolatile content (%) | 60 | 60 | 60 | 60 | 60 | 60 | 60 | 60 |
| viscosity (25° C.) | Z | W | V | V | R | Z | S | V |
| weight average molecular weight | 313400 | 55000 | 23000 | 21500 | 3300 | 305000 | 5030 | 23500 |

Note
(1) Cardula E-10 (previously mentioned)
(2) AOEX-24 (made by Daicel Chemical Industries, trade name, α-olefin oxide having a carbon number of 12 ~ 14)
(3) glycidylester of p-tert-butyl benzoic acid
(4) molecular weight of ethylamine 45.1
(5) molecular weight of ethylene diamine 60.1
(6) molecular weight of triethylene tetramine 146
(7),(8),(9),(10),(11) made by Nippon Shokubai Kagaku Kogyo K.K., trade name, polyethylen imine
(7) SP-006 ... molecular weight 600
(8) SP-018 ... molecular weight 1800
(9) SP-200 ... molecular weight 10000
(10) SP-300 ... molecular weight 30000
(11) P-1000 ... molecular weight 60000 ~ 70000
(12) Coronate EH (made by Nippon Polyurethane K.K., trade name, NCO(%) = 21(%))
(13) according to a foam viscometer of JIS K-5400 4. 2. 2

TABLE 3

| | | Application Example | | | | | | | | | | | | |
|---|---|---|---|---|---|---|---|---|---|---|---|---|---|---|
| Pigment dispersing agent No. | | 1 (1) | 2 (2) | 3 (3) | 4 (4) | 5 (5) | 6 (6) | 7 (7) | 8 (8) | 9 (9) | 10 (10) | 11 (11) | 12 (12) | 13 (13) |
| Compounding recipe of dispersion paste | pigment dispersing agent | 2.9 | 2.9 | 2.9 | 2.9 | 2.9 | 2.9 | 2.9 | 2.9 | 1.2 | 7.1 | 5.8 | 8.7 | 5.8 |
| | alkyd resin (1) | 52.0 | 52.0 | 52.0 | | | | 52.0 | 52.0 | 20.8 | | 49.1 | 46.2 | |
| | acrylic resin (2) | | | | 52.0 | 52.0 | 52.0 | | | | 69.6 | | | 49.1 |
| | ethylcellosolve | | | | 10.3 | 10.3 | 10.3 | | | | 9.1 | | | 10.3 |
| | xylene | 26.3 | 26.3 | 26.3 | 16.0 | 16.0 | 16.0 | 26.3 | 26.3 | 40.4 | 10.0 | 26.3 | 26.3 | 16.0 |
| | titanium oxide JR-602 (4) | | | | | | | | | 37.6 | | | | |
| | Carbon black FW-200 (5) | | | | | | | | | | 4.2 | | | |
| | Pariotol Red L3670 (6) | 18.8 | | | 18.8 | | | 18.8 | 18.8 | | | 18.8 | 18.8 | 18.8 |
| | Firstgen Blue RGA (7) | | 18.8 | | | 18.8 | | | | | | | | |
| | Rubicron Red 500RG (8) | | | 18.8 | | | 18.8 | | | | | | | |
| Amount of pigment dispersing agent added(%) (11) | | 10 | 10 | 10 | 10 | 10 | 10 | 10 | 10 | 2 | 100 | 20 | 30 | 20 |
| Paste viscosity (cp) (12) | | 52 | 58 | 63 | 65 | 59 | 82 | 43 | 55 | 38 | 62 | 57 | 52 | 58 |
| Storage stability | | 1.1 | 1.2 | 1.1 | 1.2 | 1.2 | 1.3 | 1.2 | 1.2 | 1.1 | 1.2 | 1.1 | 1.2 | 1.1 |
| Compounding recipe of paint | Dispersion paste | 44.2 | 44.2 | 44.2 | 44.2 | 44.2 | 44.2 | 44.2 | 44.2 | 59.1 | 24.0 | 44.2 | 44.2 | 44.2 |
| | alkyd resin (1) | 24.2 | 24.2 | 24.2 | | | | 24.2 | 24.2 | 20.1 | | 24.2 | 24.2 | |
| | acrylic resin (2) | | | | 24.2 | 24.2 | 24.2 | | | | 39.3 | | | 24.2 |
| | melamine resin (3) | 20.8 | 20.8 | 20.8 | 20.8 | 20.8 | 20.8 | 20.8 | 20.8 | 13.9 | 24.0 | 20.8 | 20.8 | 20.8 |
| | levelling agent (9) | 0.6 | 0.6 | 0.6 | 0.6 | 0.6 | 0.6 | 0.6 | 0.6 | 0.5 | 0.6 | 0.6 | 0.6 | 0.6 |
| | thinner for dilution (10) | 10.2 | 10.2 | 10.2 | 10.2 | 10.2 | 10.2 | 10.2 | 10.2 | 6.4 | 12.1 | 10.2 | 10.2 | 10.2 |
| 0° specular gloss | | 88 | 87 | 89 | 87 | 86 | 88 | 89 | 90 | 87 | 89 | 89 | 90 | 88 |

| | | Application Example | | | | | | | | | | | |
|---|---|---|---|---|---|---|---|---|---|---|---|---|---|
| Pigment dispersing agent No. | | 14 (14) | 15 (15) | 16 (16) | 17 (17) | 18 (18) | 19 (19) | 20 (20) | 21 (21) | 22 (22) | 23 (23) | 24 (24) | 25 (25) |
| Compounding recipe of dispersion paste | pigment dispersing agent | 2.9 | 2.9 | 2.9 | 2.9 | 2.9 | 2.9 | 2.9 | 2.9 | 1.2 | 7.1 | 5.8 | 8.7 |
| | alkyd resin (1) | 52.0 | 52.0 | 52.0 | | | | 52.0 | 52.0 | 20.8 | | 49.1 | 46.2 |
| | acrylic resin (2) | | | | 52.0 | 52.0 | 52.0 | | | | 69.6 | | |
| | ethylcellosolve | | | | 10.3 | 10.3 | 10.3 | | | | 9.1 | | |
| | xylene | 26.3 | 26.3 | 26.3 | 16.0 | 16.0 | 16.0 | 26.3 | 26.3 | 40.4 | 10.0 | 26.3 | 26.3 |
| | titanium oxide JR-602 (4) | | | | | | | | | 37.6 | | | |
| | Carbon black FW-200 (5) | | | | | | | | | | 4.2 | | |
| | Pariotol Red L3670 (6) | 18.8 | | | 18.8 | | | 18.8 | 18.8 | | | 18.8 | 18.8 |
| | Firstgen Blue RGA (7) | | 18.8 | | | 18.8 | | | | | | | |
| | Rubicron Red 500RG (8) | | | 18.8 | | | 18.8 | | | | | | |
| Amount of pigment dispersing agent added(%) (11) | | 10 | 10 | 10 | 10 | 10 | 10 | 10 | 10 | 2 | 100 | 20 | 30 |
| Paste viscosity (cp) (12) | | 52 | 58 | 63 | 65 | 59 | 82 | 43 | 55 | 38 | 62 | 57 | 52 |
| Storage stability | | 1.1 | 1.2 | 1.1 | 1.2 | 1.2 | 1.3 | 1.2 | 1.2 | 1.1 | 1.2 | 1.1 | 1.2 |
| Compounding recipe of paint | Dispersion paste | 44.2 | 44.2 | 44.2 | 44.2 | 44.2 | 44.2 | 44.2 | 44.2 | 59.1 | 24.0 | 44.2 | 44.2 |
| | alkyd resin (1) | 24.2 | 24.2 | 24.2 | | | | 24.2 | 24.2 | 20.1 | | 24.2 | 24.2 |
| | acrylic resin (2) | | | | 24.2 | 24.2 | 24.2 | | | | 39.3 | | |
| | melamine resin (3) | 20.8 | 20.8 | 20.8 | 20.8 | 20.8 | 20.8 | 20.8 | 20.8 | 13.9 | 24.0 | 20.8 | 20.8 |
| | levelling agent (9) | 0.6 | 0.6 | 0.6 | 0.6 | 0.6 | 0.6 | 0.6 | 0.6 | 0.5 | 0.6 | 0.6 | 0.6 |
| | thinner for dilution (10) | 10.2 | 10.2 | 10.2 | 10.2 | 10.2 | 10.2 | 10.2 | 10.2 | 6.4 | 12.1 | 10.2 | 10.2 |
| 30° specular gloss | | 88 | 87 | 89 | 87 | 86 | 88 | 89 | 90 | 87 | 89 | 89 | 90 |

| | | Application Comparative Example | | | | | | | |
|---|---|---|---|---|---|---|---|---|---|
| Pigment dispersing agent No. | | 1 (26) | 2 (27) | 3 (28) | 4 (29) | 5 (30) | 6 — | 7 — | 8 (35) |
| Compounding recipe of dispersion paste | pigment dispersing agent | 2.9 | 2.9 | 2.9 | 7.1 | 1.2 | | | 2.9 |
| | alkyd resin (13) | 52.0 | 52.0 | | | 20.8 | 59.5 | | |
| | acrylic resin (14) | | | 52.0 | 69.9 | | | 59.5 | 52.0 |
| | ethylcellosolve | | | 10.3 | 9.1 | | | 6.7 | 10.3 |
| | xylene | 26.3 | 26.3 | 16.0 | 10.0 | 40.4 | 21.7 | 15.0 | 16.0 |
| | titanium oxide JR-602 (4) | | | | | 37.6 | | | |
| | Carbon black FW-200 (5) | | | | 4.2 | | | | |
| | Pariotol Red L3670 (6) | 18.8 | | 18.8 | | | 18.8 | 18.8 | 18.8 |

TABLE 3-continued

|  |  |  |  |  |  |  |  |  |
|---|---|---|---|---|---|---|---|---|
| Firstgen Blue RGA (7) |  |  |  |  |  |  |  |  |
| Rubicron Red 500RG (8) |  | 18.8 |  |  |  |  |  |  |
| Amount of pigment dispersing agent added(%) (11) | 10 | 10 | 10 | 100 | 2 | 0 | 0 | 10 |
| Paste viscosity (cp) (12) | 560 | 970 | 1020 | 670 | 880 | 3670 | 4050 | 310 |
| Storage stability | 3.0 | 3.6 | 4.1 | 3.1 | 3.6 | 5.0 | 5.2 | 2.5 |
| Compounding recipe of paint — Dispersion paste | 44.2 | 44.2 | 44.2 | 24 | 59.1 | 44.2 | 44.2 | 44.2 |
| alkyd resin (1) | 24.2 | 24.2 |  |  | 20.1 | 24.2 |  |  |
| acrylic resin (2) |  |  | 24.2 | 39.3 |  |  | 24.2 | 24.2 |
| melamine resin (3) | 20.8 | 20.8 | 20.8 | 24.0 | 13.9 | 20.8 | 20.8 | 20.8 |
| levelling agent (9) | 0.6 | 0.6 | 0.6 | 0.6 | 0.5 | 0.6 | 0.6 | 0.6 |
| thinner for dilution (10) | 10.2 | 10.2 | 10.2 | 12.1 | 6.4 | 10.2 | 10.2 | 10.2 |
| 30° specular gloss | 70 | 73 | 75 | 76 | 71 | 53 | 48 | 70 |

|  | Application Comparative Example |  |  |  |  |  |  |  |
|---|---|---|---|---|---|---|---|---|
|  | 9 | 10 | 11 | 12 | 13 | 14 | 15 | 16 |
| Pigment dispersing agent No. | (31) | (32) | (33) | (34) | — | — | (36) | (37) |
| Compounding recipe of dispersion paste — pigment dispersing agent | 2.9 | 2.9 | 2.9 | 2.9 |  |  | 2.9 | 4.6 |
| alkyd resin (13) | 52.0 | 52.0 | 52.0 |  | 59.5 |  |  |  |
| acrylic resin (14) |  |  |  | 52.0 |  | 59.5 | 52.0 | 52.0 |
| ethylcellosolve |  |  |  | 10.3 |  | 6.7 | 10.3 | 9.1 |
| xylene | 26.3 | 26.3 | 26.3 | 16.0 | 21.7 | 15.0 | 16.0 | 15.5 |
| titanium oxide JR-602 (4) |  |  |  |  |  |  |  |  |
| Carbon black FW-200 (5) |  |  |  |  |  |  |  |  |
| Pariotol Red L3670 (6) | 18.8 |  |  | 18.8 | 18.8 | 18.8 | 18.8 | 18.8 |
| Firstgen Blue RGA (7) |  | 18.8 |  |  |  |  |  |  |
| Rubicron Red 500RG (8) |  |  | 18.8 |  |  |  |  |  |
| Amount of pigment dispersing agent added(%) (11) | 10 | 10 | 10 | 10 | 0 | 0 | 10 | 10 |
| Paste viscosity (cp) (12) | 560 | 680 | 970 | 1020 | 3670 | 4050 | 310 | 890 |
| Storage stability | 3.0 | 3.2 | 3.6 | 4.1 | 5.0 | 5.2 | 2.5 | 3.3 |
| Compounding recipe of paint — Dispersion paste | 44.2 | 44.2 | 44.2 | 44.2 | 44.2 | 44.2 | 44.2 | 44.2 |
| alkyd resin (1) | 24.2 | 24.2 | 24.2 |  | 24.2 |  |  |  |
| acrylic resin (2) |  |  |  | 24.2 |  | 24.2 | 24.2 | 24.2 |
| melamine resin (3) | 20.8 | 20.8 | 20.8 | 20.8 | 20.8 | 20.8 | 20.8 | 20.8 |
| levelling agent (9) | 0.6 | 0.6 | 0.6 | 0.6 | 0.6 | 0.6 | 0.6 | 0.6 |
| thinner for dilution (10) | 10.2 | 10.2 | 10.2 | 10.2 | 10.2 | 10.2 | 10.2 | 10.2 |
| 30° specular gloss | 70 | 72 | 73 | 75 | 53 | 48 | 70 | 61 |

Note
(1) Phthalkyd 133-60 (made by Hitachi Kasei Kogyo K.K., trade name, solid content: 60%)
(2) Aromatex P646 (made by Mitsui Toatsu Chemicals, Inc., trade name, solid content: 60%)
(3) Uban 220 (made by Mitsui Toatsu Chemicals, Inc., trade name, solid content: 60%)
(4) titanium oxide, JR-602 (made by Teikoku Kako K.K., trade name)
(5) Carbon black FW-200 (made by Desac AG, trade name)
(6) Pariotol Red L3670 (perilene series organic pigment, made by Basf AG, trade name)
(7) Firstgen Blue RGA (cupperphthalocyanine series organic pigment, made by Dainippon Ink & Chemicals, Inc., trade name)
(8) Rubicron Red 500RG (quinacrydone series organic pigment, made by Toyo Soda Mfg. Co., Ltd., trade name)
(9) levelling agent, Modaflow, made by Monsanto Co., trade name, 10% xylene solution
(10) thinner for dilution: cellosolve acetate/xylene = 50/50%
(11) amount of pigment dipsering agent added to pigment (%)
(12) measured at 20° C. by means of B type viscometer (unit: cp)
(13) alkyd resin produced by Synthesis Example 1
(14) acrylic resin produced by Synthesis Example 2

As seen from Application Examples 1~25 of Table 3, the dispersion pastes produced by using the pigment dispersing agents according to the invention are low in the viscosity, so that it is possible to produce paints having a high solid content, and the storage stability is excellent. Further, the paints produced by using the pigment dispersing agents according to the invention are excellent in the specular gloss at 30° of paint film.

On the contrary, Application Comparative Example 9 in which the weight average molecular weight of the component B is less than 1,000, Application Comparative Example 10 in which the weight average molecular weight of the component B is more than 80,000, Application Comparative Examples 2 and 11 in which the molecular weight of amine compound as a component A is less than 60, Application Comparative Example 13 wherein the amine compound of the component A exceeds 30,000, Application Comparative Example 4 in which the mol ratio of component A/component B is less than 1, Application Comparative Example 5 in which the mol ratio of component A/component B exceeds 1/200, Application Comparative Examples 6, 7, 13 and 14 using no pigment dispersing agent according to the invention, Application Comparative Example 8 corresponding to the invention of European Patent laid open No. 208041 and Application Comparative Example 16 corresponding to the invention of U.S. Pat. No. 368,771 all use the pigment dispersing agents of the comparative examples outside the scope of the invention, so that the viscosity of the dispersion paste is high, the storage stability is poor and also the specular gloss at 30° of paint film is poor. Further, in Application Comparative Examples 12 and 15, m/n of the component B exceeds 0.5, so that the resulting pigment dispersing agent is waxy and consequently not only the handling is inconvenient but also the compatibility with the acrylic resin is poor, and further the viscosity of the dispersion paste is high and the storage stability and specular gloss at 30° of paint film are poor.

INDUSTRIAL APPLICABILITY

The pigment dispersing agents according to the invention are useful for the production of dispersion paste and paint. The dispersion pastes produced by using them are low in the viscosity, so that paints having a high solid content can be produced, and also they are excellent in the storage stability and applicable to the wide range of resins. Further, the paint film made from the paint using the pigment dispersing agent according to the invention are excellent in the gloss, sharpness and coloring strength.

We claim:

1. A pigment dispersing agent being a product obtained by reacting a component A of an amine compound having one or more active hydrogen atom per one molecule and a weight average molecular weight of 60~30,000 with at least one component B represented by the following general formula (I), (II) or (III):

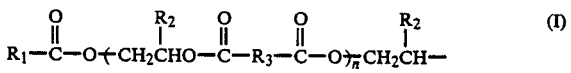

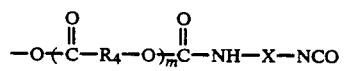

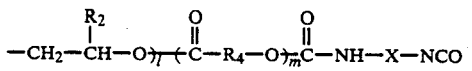

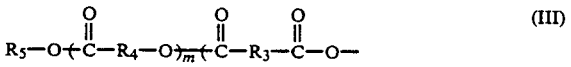

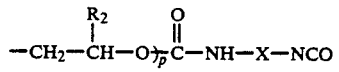

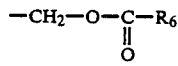

wherein $R_1$ is an alkyl group having a carbon number of 1~20 or a residue of aromatic monocarboxylic acid, $R_2$ is a phenyl group, an alkyl group having a carbon number of 5~19, $$-CH_2-O-\underset{\underset{O}{\|}}{C}-R_6$$

group ($R_6$ is an alkyl group or an aromatic group having a carbon number of 3~17) or —$CH_2$—O—$R_7$ group ($R_7$ is an alkyl group or an aromatic group having a carbon number of 4~18), $R_3$ is a residue of acid anhydride having a carbon number of 2~6, $R_4$ is an alkylene group having a carbon number of 1~7, $R_5$ is a residue of saturated aliphatic, alicyclic or aromatic monoalcohol having a carbon number of 1~18, X is a residue of saturated aliphatic, alicyclic or aromatic diisocyanate having a carbon number of 6~20, each of n, l and p is an integer of 1~200, and m is an integer of 0~100 provided that 0≦m/n, m/l, m/p≦0.5.

2. The pigment dispersing agent according to claim 1, wherein said component A and component B have a mol ratio of 1:1~1:200.

3. A pigment dispersing agent being a product obtained by reacting a reaction product between a component A of an amine compound having one or more active hydrogen atom per one molecule and a weight average molecular weight of 60~30,000 and at least one component B represented by the following general formula (I), (II) or (III):

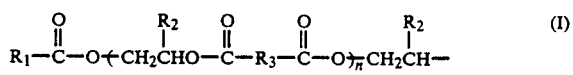

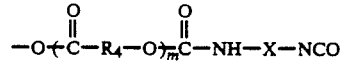

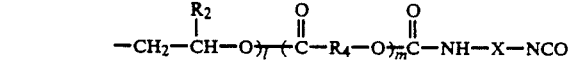

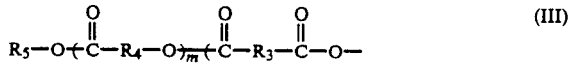

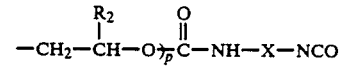

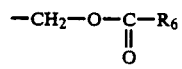

wherein $R_1$ is an alkyl group having a carbon number of 1~20 or a residue of aromatic monocarboxylic acid, $R_2$ is a phenyl group, an alkyl group having a carbon number of 5~19, $$-CH_2-O-\underset{\underset{O}{\|}}{C}-R_6$$

group ($R_6$ is an alkyl group or an aromatic group having a carbon number of 3~17) or —$CH_2$—O—$R_7$ group ($R_7$ is an alkyl group or an aromatic group having a carbon number of 4~18), $R_3$ is a residue of acid anhydride having a carbon number of 2~6, $R_4$ is an alkylene group having a carbon number of 1~7, $R_5$ is a residue of saturated aliphatic, alicyclic or aromatic monoalcohol having a carbon number of 1~18, X is a residue of saturated aliphatic, alicyclic or aromatic diisocyanate having a carbon number of 6~20, each of n, l and p is an integer of 1~200, and m is an integer of 0~100 provided that 0≦m/n, m/l, m/p≦0.5 with a component C of a polyisocyanate compound having two or more isocyanate groups.

4. The pigment dispersing agent according to claim 3, wherein when mol number of active hydrogen atom of said component A is a, mol number of said component B is b and mol number of isocyanate group of said component C is c, b is 1~a and c is 0~(a-b).

* * * * *